(12) United States Patent
Mahalingaiah

(10) Patent No.: US 8,683,572 B1
(45) Date of Patent: Mar. 25, 2014

(54) METHOD AND APPARATUS FOR PROVIDING CONTINUOUS USER VERIFICATION IN A PACKET-BASED NETWORK

(75) Inventor: Rupaka Mahalingaiah, Austin, TX (US)

(73) Assignee: Dunti LLC, Austin, TX (US)

( * ) Notice: Subject to any disclaimer, the term of this patent is extended or adjusted under 35 U.S.C. 154(b) by 1274 days.

(21) Appl. No.: 12/018,861

(22) Filed: Jan. 24, 2008

(51) Int. Cl.
*H04L 29/00* (2006.01)

(52) U.S. Cl.
USPC .............................................. 726/10; 370/389

(58) Field of Classification Search
USPC ........................................................ 370/389
See application file for complete search history.

(56) References Cited

U.S. PATENT DOCUMENTS

| | | |
|---|---|---|
| 4,507,782 A | 3/1985 | Kunimasa et al. |
| 4,538,026 A | 8/1985 | Yasue |
| 4,615,028 A | 9/1986 | Lewis et al. |
| 4,679,191 A | 7/1987 | Nelson et al. |
| 4,933,930 A | 6/1990 | Lien et al. |
| 5,023,872 A | 6/1991 | Annamalai |
| 5,095,480 A | 3/1992 | Fenner |
| 5,134,610 A | 7/1992 | Shand et al. |
| 5,175,765 A | 12/1992 | Perlman |
| 5,226,039 A | 7/1993 | Frank et al. |
| 5,319,644 A | 6/1994 | Liang |
| 5,425,026 A | 6/1995 | Mori |
| 5,442,708 A | 8/1995 | Adams et al. |
| 5,444,702 A | 8/1995 | Burnett et al. |
| 5,485,455 A | 1/1996 | Dobbins et al. |
| 5,509,000 A | 4/1996 | Oberlander |
| 5,524,254 A | 6/1996 | Morgan et al. |
| 5,548,646 A | 8/1996 | Aziz et al. |
| 5,566,193 A | 10/1996 | Cloonan |
| 5,568,482 A | 10/1996 | Li et al. |
| 5,596,715 A | 1/1997 | Klein et al. |
| 5,633,869 A | 5/1997 | Burnett et al. |
| 5,682,479 A | 10/1997 | Newhall et al. |
| 5,721,819 A | 2/1998 | Galles et al. |
| 5,757,924 A | 5/1998 | Friedman et al. |
| 5,790,546 A | 8/1998 | Dobbins et al. |
| 5,822,309 A | 10/1998 | Ayanoglu et al. |
| 5,864,683 A | 1/1999 | Boebert et al. |

(Continued)

FOREIGN PATENT DOCUMENTS

| | | |
|---|---|---|
| EP | 0403973 | 12/1990 |
| EP | 0751642 | 1/1997 |
| EP | 0855820 | 7/1998 |

OTHER PUBLICATIONS

Lucent Technologies, "CBQ Frequently-Asked Questions," www.xedia.com/products/cbq_faq.htm, last modified: May 26, 1999, 6 pages.

(Continued)

*Primary Examiner* — Jeffrey Pwu
*Assistant Examiner* — Helai Salehi
(74) *Attorney, Agent, or Firm* — Charles D. Huston; Daffer McDaniel LLP

(57) ABSTRACT

A system and method of authenticating a user of a data network which inserts control information into certain data packets being sent over the network. The control information is user-specific, including such items as user identity, password, originating CPU, or biometric information. Inserting the control information into data packets transmitted during the entire session permits continuous authentication.

16 Claims, 13 Drawing Sheets

(56) References Cited

U.S. PATENT DOCUMENTS

| | | |
|---|---|---|
| 5,884,024 A | 3/1999 | Lim et al. |
| 5,917,821 A | 6/1999 | Gobuyan et al. |
| 5,920,566 A | 7/1999 | Hendel et al. |
| 5,961,607 A | 10/1999 | Schaefers |
| 5,970,232 A | 10/1999 | Passint et al. |
| 5,999,991 A | 12/1999 | Smith et al. |
| 6,006,090 A | 12/1999 | Coleman et al. |
| 6,006,272 A | 12/1999 | Aravamudan et al. |
| 6,088,758 A | 7/2000 | Kaufman et al. |
| 6,119,171 A | 9/2000 | Alkhatib |
| 6,122,278 A | 9/2000 | Bell |
| 6,130,892 A | 10/2000 | Short et al. |
| 6,134,589 A | 10/2000 | Hultgren |
| 6,157,967 A | 12/2000 | Horst et al. |
| 6,170,025 B1 | 1/2001 | Drottar et al. |
| 6,173,312 B1 | 1/2001 | Atarashi et al. |
| 6,185,680 B1 | 2/2001 | Shimbo et al. |
| 6,226,267 B1 | 5/2001 | Spinney et al. |
| 6,229,806 B1 * | 5/2001 | Lockhart et al. ............ 370/389 |
| 6,237,061 B1 | 5/2001 | Srinivasan et al. |
| 6,260,120 B1 | 7/2001 | Blumenau et al. |
| 6,275,492 B1 | 8/2001 | Zhang |
| 6,275,494 B1 | 8/2001 | Endo et al. |
| 6,292,492 B1 | 9/2001 | Bonomi et al. |
| 6,304,552 B1 | 10/2001 | Chapman et al. |
| 6,307,837 B1 | 10/2001 | Ichikawa et al. |
| 6,356,551 B1 | 3/2002 | Egbert |
| 6,373,837 B1 | 4/2002 | Kleyman et al. |
| 6,377,575 B1 | 4/2002 | Mullaney et al. |
| 6,389,532 B1 | 5/2002 | Gupta et al. |
| 6,393,482 B1 | 5/2002 | Rai et al. |
| 6,412,007 B1 | 6/2002 | Bui et al. |
| 6,421,714 B1 | 7/2002 | Rai et al. |
| 6,466,964 B1 | 10/2002 | Leung et al. |
| 6,484,605 B1 | 11/2002 | Murg |
| 6,490,259 B1 | 12/2002 | Agrawal et al. |
| 6,519,242 B1 | 2/2003 | Emery et al. |
| 6,584,102 B1 | 6/2003 | Lu |
| 6,643,286 B1 | 11/2003 | Kapadia et al. |
| 6,795,857 B1 | 9/2004 | Leung et al. |
| 6,889,321 B1 | 5/2005 | Kung et al. |
| 2001/0010692 A1 | 8/2001 | Sindhu et al. |
| 2002/0010793 A1 | 1/2002 | Noll et al. |
| 2004/0176134 A1 * | 9/2004 | Goldthwaite et al. ........ 455/558 |

OTHER PUBLICATIONS

Lucent Technologies, "Demystifying Bandwidth Management," Dec. 1999, pp. 1-12.

Lucent Technologies, "Delivering Internet Access Quality of Service," Dec. 1999, pp. 1-8.

Antonio et al., "A Fast Distributed Shortest Path Algorithm for a Class of Hierarchically Structured Data Networks," IEEE Apr. 1989, pp. 183-192.

Tsuchiya, "Efficient Utilization of Two Level Hierarchical Addresses," IEEE Dec. 1992, pp. 1016-1021.

Stevens, "TCP/IP", Addison-Wesley 2000, pp. 37-45.

* cited by examiner

FIG. 12 Hash based method

METHOD AND APPARATUS FOR PROVIDING CONTINUOUS USER VERIFICATION IN A PACKET-BASED NETWORK

RELATED APPLICATIONS

The present application is related to U.S. patent application Ser. No. 10/866,358 filed Jun. 11, 2004 which is a continuation-in-part of the following: (1) U.S. patent application Ser. No. 09/312,193 filed May 14, 1999 now abandoned; (2) U.S. patent application Ser. No. 09/312,240 filed May 14, 1999 now U.S. Pat. No. 6,788,701; (3) U.S. patent application Ser. No. 09/356,651 filed Jul. 19, 1999 now U.S. Pat. No. 6,754,214; (4) U.S. patent application Ser. No. 09/549,623 filed Apr. 14, 2000 now abandoned; (5) U.S. patent application Ser. No. 09/571,027 filed May 15, 2000 now U.S. Pat. No. 6,912,196; (6) U.S. patent application Ser. No. 10/375,833 filed Feb. 27, 2003 now U.S. Pat. No. 6,804,235 which is a continuation of U.S. patent application Ser. No. 09/785,899 filed Feb. 16, 2001 now U.S. Pat. No. 6,587,462; (7) U.S. patent application Ser. No. 10/100,980 filed Mar. 19, 2002; and (8) U.S. patent Ser. No. 10/112,832 filed Mar. 29, 2002, all of which are incorporated herein by reference.

BACKGROUND OF THE INVENTION

1. Field of the Invention

This invention relates to communication systems and associated devices and more particularly to methods of identifying the authenticity of a user accessing the communication system resources.

2. Description of the Related Art

A communication system generally includes multiple communication devices interconnected to each other in such a way that each device may be able to establish a communication path with another device within the communication system. The interconnection between devices may take the form of an interconnected set of sub-networks or subnets. A network can be made up of localized subnets, or can be extended to include multiple subnets to form an intranet. Further, multiple intranets can be extended to form an Internet.

Devices within a network communicate with one another using packet-based protocols such as Internet Protocol ("IP") and Transmission Control Protocol ("Session Layer"). Data to be transmitted over the network using Session Layer/IP is broken up into a number of packets, which are transferred over the network along with embedded address and control information within each IP packet. These IP packets are separately sent across the network, possibly using different network paths, and are then re-assembled at a receiving device.

To ensure the reliability of the packet transmission, each layer of the popular Open System Interconnect ("OSI") stack is responsible for a different aspect of transmission. The lower layers maintain the physical connection between devices while low-level protocols such as MAC Layer provide a method for sharing the communication medium as well as encapsulating higher-layer packets such as IP.

The IP protocol provides a method for routing packets within and between intranets, and across logically separated network segments. It also includes methods for CRC error checking and fragmenting data into smaller frames depending on the Maximum Transmission Unit ("MTU") of the system. The Internet Protocol Version 4 ("IPv4") specification provides for a 32-bit address field for packet source and destination, while the newer IPv6 specification expands this to 128 bits. The IP packet itself may encapsulate higher-layer communication protocols, such Session Layer, which can handle more advanced packet transmission functions such as out-of-order packet handling, communication timeouts and packet re-transmission.

A host is any device which can send and receive data and, as used herein, is generally found at the end nodes within a communications system. Each host will generally be capable of communicating using one or more of the protocols that are supported by the communication system, such as Session Layer/IP.

Secure communication may also be established across a public network using technologies such as Secure Sockets Layer (SSL), which breaks-up data into SSL Records that are encrypted during communications. Each SSL Record provides data user verification through the use of a message authentication code (MAC), which is a hash of each SSL Record. The hash function uses either MD5 or SHA-1.

SSL can use public key encryption to authenticate both parties to each other; however, common implementations such as HTTPS only authenticate the server to the client. SSL is utilized by HTTPS to establish secure web-based transactions. These transactions rely on SSL to encrypt the communication and authenticate the server to the client at the beginning of the session using certificates. However, SSL is not used by HTTPS to authenticate the user to the server. Web-based transactions using HTTPS rely on separate user verification methods to authenticate the user to the server. These methods typically include a username and password or challenge/response mechanisms. Once the user has authenticated to the server at the beginning of the session, the user is no longer authenticated for the rest of the session.

Certificates are used to authenticate the server to the client at the beginning of the SSL session. A certificate contains information about the server, and is signed by a certificate authority (CA). The CA is a trusted entity that is responsible for identifying certificate owners. A chain of signed certificates creates a certificate hierarchy. A web-browser will be able to identify and trust a certificate at some point in this hierarchy, forming a level of trust with the server that the client is connecting to.

Digital signatures are used along with encryption to provide authentication and assure integrity of the transmitted data. This is a type of asymmetric cryptography used to simulate the security properties of a signature in digital. Digital signature schemes are also based on PKI schemes wherein sending and receiving parties are given two algorithms, one for signing which involves the user's secret or private key, and one for verifying signatures which involves the user's public key. Digital signatures are like a fingerprint of a document or message that can be verified at the beginning or end. Digital signatures are used when the sender and receiver of a message may have a need for confidence that the message has not been altered during transmission. Although encryption hides the contents of a message, it may be possible to change an encrypted message without understanding it (some encryption algorithms known as nonmalleable ones prevent this, but others do not). If a message is digitally signed, any change in the message will invalidate the signature.

Digital signatures have several drawbacks. They are not particularly suited for online transactions. Also, typically, they work on the entire message and as such are susceptible to attacks such as phishing and pharming. Also, Digital signatures are themselves subjected to several problems such as trusted time stamping. Another problem with this scheme is the non-repudiation, where at a later date the transaction has to be verified.

The server sends the certificate containing the public key to the client. This public key is used by the client to encrypt a symmetric encryption key that will be used during the SSL session. The client and server must both support the symmetric encryption algorithm used. Typical algorithms include DES or triple-DES. Both data and the MAC are encrypted using this algorithm.

One weakness of SSL is that the client is only verified at the beginning of the SSL session. Once the client is authenticated, the MAC inserted into each SSL record authenticates the data, but this does not prevent a hacker from performing a man-in-the-middle attack. One example of such an attack utilizes techniques such as phishing or pharming, whereby a hacker can impersonate a login session, making the victim use SSL to reveal their username and password through the fake login. The hacker then relays the communication, with any changes, to the service provider. Communication from the service provider is also relayed through the hacker. In this way, the hacker effectively bypasses SSL security.

Network communication security methods such as VPN, IPsec, and SSL only provide user verification at the beginning of the session, or when the connection is first established.

It would be desirable to have a method for securing communications across a public or private network that could ensure that data was not visible to a third party and that it was not tampered with. Further, the identity of the sender should be authenticated continuously throughout communication session, ensuring that only the correct hosts have access to the information. Each packet should have embedded information that identifies the original packet data as well as the authenticated user. User verification can come from single or multifactor identification methods, including passwords, software tokens and hardware tokens. By authenticating the data and the user continuously throughout communication session, session hijacking and man-in-the-middle attacks can be prevented.

The secure communications method should be compatible with higher and lower level security methods such as HTTPS, SSL, VPN, and IPsec, but should provide the capability of continuous user and data user verification.

SUMMARY OF THE INVENTION

The problems outlined above are in large part solved by utilizing a mechanism that inserts control and authentication information into specified packets that are to be sent across the network as a means to authenticate the user, device and data within the transmission of specified packets. This control information may include user, device and data user verification information. Any packet sent by the source may include this information, allowing the destination to authenticate the source of the packet, as well as the contents. The control and authentication information may be implemented throughout a communication session thus providing continuous authentication for the entire communication session.

In one embodiment, the scheme may be implemented in hardware or software transparent to the user. This will automatically control securing communications sessions. In another embodiment, user may be allowed to enable secure communication using this scheme when desired. In yet another embodiment, filtered secure communication may be enabled automatically based on certain filters.

This information may be embedded in the payload portion of any network layer from layer 2 through layer 7 of the OSI model, depending on the implementation. The placement of the embedded user and device user verification information is done in such a way that only the hosts that are communicating will be able to restore the user verification information. Further, inserting the control information into the payload portion of any network protocol that does not contain another protocol used to switch or route the packet will ensure compatible functioning of the packet transmission across public networks using any standard intermediate switching and routing equipment.

A communication system comprises a network of interconnected sub-networks or subnets. Connected to the network are two or more individual hosts or subnets that need to communicate securely with each other over the network. The network consists of multiple intermediate network interconnects which allow the hosts to communicate. As defined herein, a network interconnect is a generic term which describes a network device which receives packets and then forwards them to hosts or other network devices in the network, and which may have the capability of dropping them. Each of these interconnects may have additional connections to hosts or other interconnects within the network. The interconnects or hosts that come in contact with the packet once it leaves the sending host may be considered as the public network. If the sending host belongs to a subnet that is shared with other hosts within that subnet, then once a packet leaves that subnet, that packet can be considered to have entered the public network.

A packet of information to be sent securely from one host to another host on a network consists of one or more common protocols that are shared between hosts. Each protocol consists of information that allows the packet to transit through the network to reach each destination host. One protocol may encapsulate another protocol, such that the payload portion of one protocol can contain another protocol. Each device that receives or forwards the packet can utilize or ignore certain information within any of these protocols as required to make a decision about what to do with the packet.

To ensure the identity verification of the user and/or the source computer, a verification control message (VCM) is provided. The VCM is created by a host that is to transmit data to another host. The VCM is inserted into the data stream by the transmitting host. The receiving host will verify the authenticity of the transmitting host as well as the identity of the user based on the VCM. It may use pre-defined VCM parameters, compute VCM, or generate VCM based on certain information embedded in the VCM. Upon positive identification, a communication session will be established. Failure will result in a denial of the communication session.

According to one embodiment, the contents of the VCM may include user name and password of the user. According to another embodiment, the contents of the VCM may include identification of the transmitting host. According to another embodiment, the contents of the VCM may include data verification information. According to yet another embodiment, the contents of the VCM may include user, device, and data verification information related to the sending host that will be processed by the receiving host. According to yet another embodiment, the contents of the VCM may include additional control information to be passed between hosts. According to yet another embodiment, the contents of the VCM may contain additional random data to vary the length of the VCM.

User verification information may consist of any user-specific information that is available to the sending host, such as a pass code, biometrics, or pre-assigned user identification. Device user verification information may consist of device-specific information such as the CPU ID or hardware configuration. Data user verification information may consist of data-specific information such as a checksum or a hash of the packet data. Additional parameters may be included that will change the VCM for each packet, such as packet number, time or checksum. The user, device and data user verification information, combined with any packet-specific parameters, are encrypted or hashed together and inserted into the VCM.

The VCM can be of any length, and when it is inserted into a packet, the length of the packet will change. In most cases, any checksum or CRC value within the packet will have to be modified to reflect the change in length made to the packet. If there is a limitation to the overall length of the packet, this will be considered. In addition, the contents of the VCM can contain the values that were modified, such as the original checksum value, so that the receiving host can restore those values quickly.

The VCM may be inserted into the each packet or some packets of the data stream. According to one embodiment, VCM is inserted into every packet to be sent from one host to another. The VCM is inserted into the payload portion of a selected protocol that does not contain another protocol that is used by intermediate interconnects to route the packet. A packet containing a VCM will be referred to hereafter as an authenticated packet (AP). The VCM consists of a contiguous block of bytes. The location of the VCM will be at the beginning of the data portion of the protocol selected. By adding the VCM to the payload portion of each packet, the original data is altered. In the case where the original payload contains encrypted information, the addition of the VCM will prevent the data from being decrypted without first removing the VCM, which requires knowledge of its location and length.

According to another embodiment, the VCM is divided into segments, with each segment being inserted at different locations within a packet. A protocol is selected that does not contain another protocol that is used by intermediate interconnects to route the packet. Within the payload of this protocol, the VCM segments may be inserted at any location within the packet. Each VCM segment may contain information about the location of the next VCM segment within that packet. Alternatively, any VCM or VCM segment may contain information about the location of any or all VCM segments within a packet.

According to another embodiment, the VCM is inserted only in some packets to be transmitted between hosts. The choice of which packets will contain a VCM is based on a random hash method. This hash method can be based on information available to both the sending and receiving host, such as a pre-exchanged key.

According to another embodiment, a method is provided for determining the packets that contain an VCM, and the location of the VCM within those packets. Each VCM contains information that identifies the next packet that contains the next VCM, as well as its location in that packet. The receiving host must have access to a sequential identifier in each packet to accommodate out-of-order reception of packets. For this purpose, this method may utilize a packet identifier that may be available in any protocol that is used to route the packet.

According to another embodiment, a method is provided to obscure the location and length of the VCM or VCM segments within a packet. Additional data may be added to the VCM for the purpose of making it harder for an unauthorized host to identify and locate the VCM or VCM segments within a packet. This additional "dummy" data can be individual or groups of bits or bytes added to the beginning, the end, or at any point within the VCM or any VCM segment. The location of this dummy data is known only to the sending and receiving hosts, which can exchange this information ahead of time, or within previously sent VCMs.

Each host or interconnect may have an upper limit to the number of bytes that a packet can carry. This parameter may be commonly referred to as a maximum transmission unit (MTU). If a packet that is to be transmitted exceeds the MTU value within that host, the network layer of the OSI stack will generate additional packets as required to account for the data that exceeds the MTU. Each of these additional packets will contain a MAC header, an network layer header, and the remaining portion of the packet will continue where the previous packet ended. This process of creating additional packets is called fragmentation.

Fragmented network layer packets that arrive at the receiving host are temporarily stored while they are re-assembled to construct the original network datagram. If one or more of the fragments does not arrive in a specified period of time, the network layer discards the entire network layer datagram. The session layer will time-out and request that the entire network layer datagram be resent, including all fragments. The session layer at the receiving host is always presented with a reassembled (unfragmented) datagram.

The MTU value may be established by certain applications to optimize performance or provide certain functionality. The MTU between two hosts on a network is negotiated between the hosts so that the lowest MTU is selected among all interconnects between the hosts, as well as the hosts themselves. The session layer also uses a parameter called maximum segment size (MSS) to limit fragmentation. The MSS imposes an upper limit on the session layer payload, and may be utilized to meet MTU requirements.

The network layer negotiates MTU by having one host send a large packet to another host with instructions indicating that the packet should not be fragmented. If the packet cannot be forwarded at any point in the network without fragmentation, then it is discarded and a message is sent back to the transmitting host. This message contains the lowest MTU detected in the path so far, and the host re-transmits the packet using the new MTU. This process is repeated until the packet is successfully delivered to the receiving host.

Thus, one way to solve the MTU problem is to intercept these packets and lower the MTU as they are exchanged to account for the VCM. At the end of the negotiation, the MTU passed to the other network layers would be the real MTU minus the size of the VCM payload.

Since the VCM is added to the payload of the packet, the maximum packet size may be reduced by the maximum size of the VCM so that fragmentation is limited or prevented. In a session layer/network layer network, for example, the MSS or MTU can be reduced by the maximum size of the VCM. Once the VCM is added, it will not exceed the MTU and the VCM will not cause packet fragmentation.

An AP is sent from one host with the VCM inserted into the payload portion of the selected protocol. The AP is processed by one or more intermediate network devices before reaching a destination host. The intermediate devices process the packet by using the data contained in one or more of the protocols included in the packet that are not modified by the VCM. The VCM inserted into the packet by the sending host will be ignored by each intermediate network device, and will not affect the routing of the packet. Each intermediate network device will perceive the VCM as standard payload data, and as such it will not process this data in any way.

According one embodiment, a method is provided to extract the VCM that was inserted into the packet by the transmitting host, and to restore the remainder of the packet to its original form and contents. Packets will reach their intended destination using one or more protocols shared by the sending and receiving host. The VCM that was inserted into the packet will be extracted to obtain the original VCM control message, and to restore the contents of the payload data portion of the packet where the VCM was inserted. Finally, any portion of the original packet that was modified during the insertion of the VCM can be restored, such as packet checksum or CRC values. These values can be part of the VCM itself, to reduce packet-processing time by the receiving host. Once the packet is fully restored, it is passed to higher layers of the OSI stack, which normally process the packet.

According to another embodiment, a method is provided to process the VCM that was inserted into the packet by the transmitting host, and authenticate both the data and the identity of the sending device and sending user.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
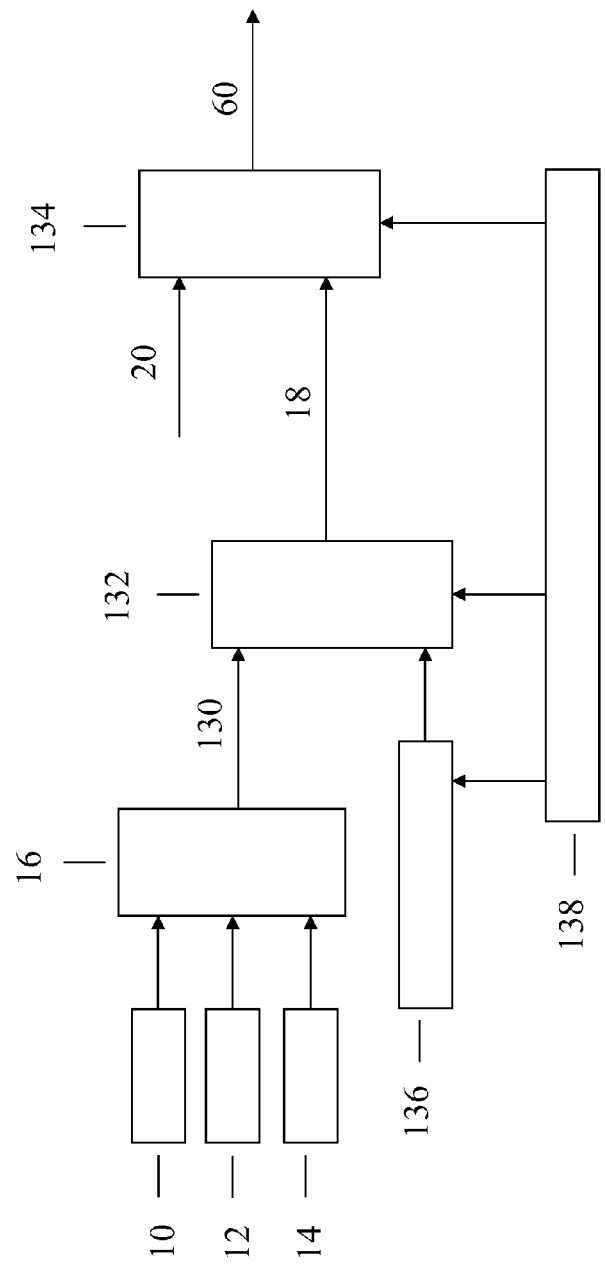
FIG. 1 is a diagram illustrating the construction of an AP.

FIG. 1 illustrates the creation of an authenticated packet (AP) 60. An encoding function 16 accepts user verification information 10, host verification information 12, and data verification information 14. The encoding function 16 then encodes the verification information into a single encoded verification value 130. The encoding function 16 utilizes a method such as a one-way hash to produce the encoded verification value 130. A verification control message (VCM) generation function 132 combines encoded verification value 130 with control field 136 to produce VCM 18. The control field 136 may contain any control information that needs to be passed from the sending host to the receiving host. The VCM 18 may then be inserted within MAC layer packet 20 by AP generation function 134 to become an AP 60.

VCM security function 138 may generate random data to be inserted at any location within VCM 18 on a per-packet basis. This random data obscures the VCM contents and varies the VCM length on a per-packet basis. VCM security function 138 provides VCM generation function 132 with the random data and the random data location(s). In addition, VCM security function 138 generates the random data and location(s) for the next VCM 18, and inserts this information within control field 136. This allows the receiving host to determine the location of the random data within the VCM 18 of each received AP 60. As an alternative to inserting the information in control field 136, both hosts may contain information about where the random data is located for each packet. This information can be exchanged ahead of time by utilizing control field 136.

Further, VCM security function 138 may request VCM generation function 132 to split VCM 18 into multiple chunks to be located at multiple locations within the payload of a packet. The number of chunks, and the starting locations and length of each chunk are all independently variable. VCM security function 138 provides VCM generation function 132 with the number of chunks and their bit or byte offset values from the end of the transport header 44. In addition, VCM security function 138 generates the number of chunks and their bit or byte offset values for the next VCM 18, and inserts this information within control field 136. This allows the receiving host to reassemble the VCM 18 from the individual chunks within each received AP 60. As an alternative to inserting the information in control field 136, both hosts may contain information about where individual chunks are located for each packet. This information can be exchanged ahead of time by utilizing control field 136.

Further, VCM security function 138 may request VCM generation function 132 to insert VCM 18 in all APs 60 or within specified APs 60. VCM security function 138 provides AP generation function 134 with information about which packet(s) should contain a VCM 18. The control field 136 could create its own sequence numbers for this purpose, or rely on a sequence number available in one of the existing protocols (i.e. IP sequence number).

VCM security function 138 determines which AP 60 (that has not yet been sent) will contain a VCM 18, and inserts this information into the control field 136 of the current AP 60. Since some APs will not contain a VCM 18, the control field 136 of APs that do contain a VCM 18 will include this information to allow the receiving host to determine which AP 60 will contain the next VCM 18.

Figure 2:
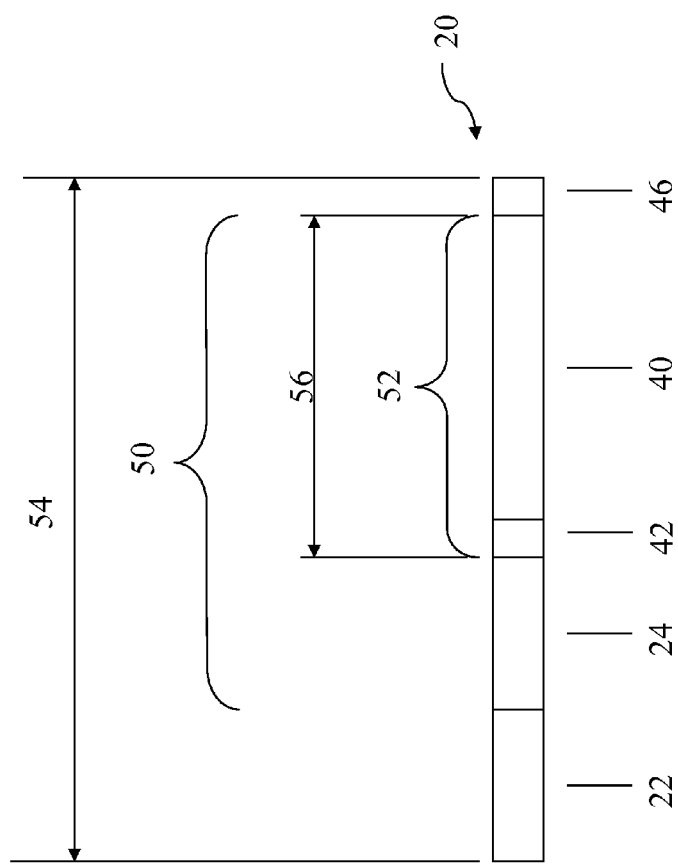
FIG. 2 is a diagram of a network layer packet encapsulated within a media access controller ("MAC") layer packet.

FIG. 2 illustrates an MAC layer packet 20 that contains a network layer packet 50 and an MAC layer CRC checksum 46. The network layer packet 50 consists of a network layer header 24 and network layer payload 52. The network layer payload 52 may consist of another protocol, such as session layer or UDP, which will consist of transport layer header 42 and transport payload 40.

Figure 3:
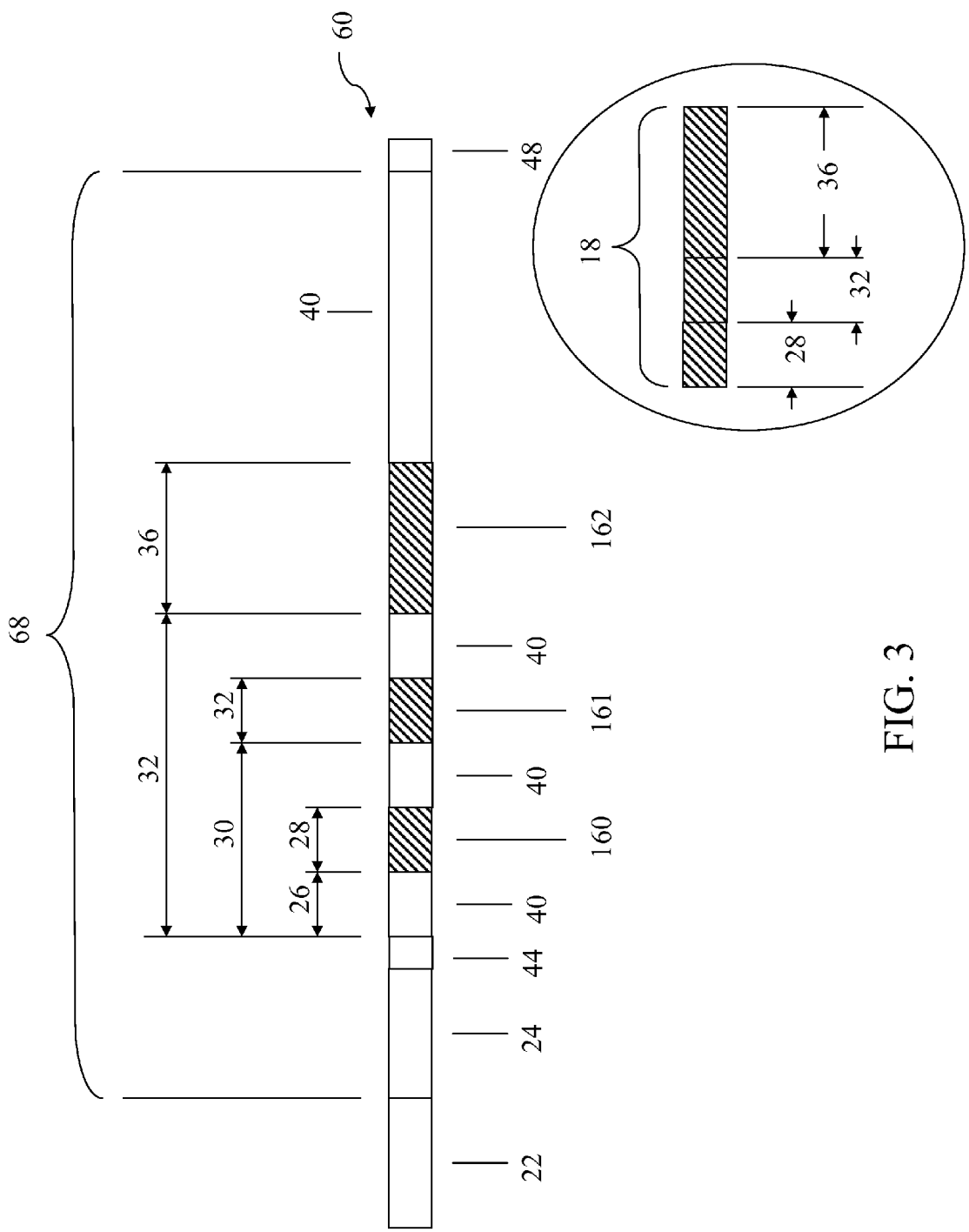
FIG. 3 is a diagram showing the insertion of the VCM into the network layer payload, resulting in an AP.

Turning now to FIG. 3, an MAC layer packet is modified by inserting VCM 18 into the transport payload 40 to create modified network layer packet 68 and authenticated packet ("AP") 60. AP 60 is used for secure communication between hosts. The VCM generation function 132 splits-up VCM 18 into chunks 160, 161 and 162 with lengths 28, 32 and 36, respectively, and inserted into the transport payload 40 at random offsets 26, 30 and 34, respectively. Each of the chunks 160, 161, and 162 are separated by normal transport payload 40. The MAC layer CRC 48 is appended by a data link layer device after the VCM 18 is added to the packet, and if present during packet receive, the MAC will remove it.

After the VCM 18 is inserted, the packet becomes an AP 60. The session layer or UDP data checksum within transport layer header 42 needs to be re-calculated to account for the additional data in VCM 18 and re-inserted as modified transport layer header 44. This will allow compatibility with intermediate hardware and software that validates the session layer header. The total length field in the network layer header 24 also needs to be re-calculated to account for the additional data in VCM 18.

The maximum segment size (MSS) of the transmitting and receiving hosts is established at the beginning of the session layer session. The normal MSS value is reduced by the maximum size of the VCM 18 to limit or prevent fragmented network layer packets.

Figure 4:
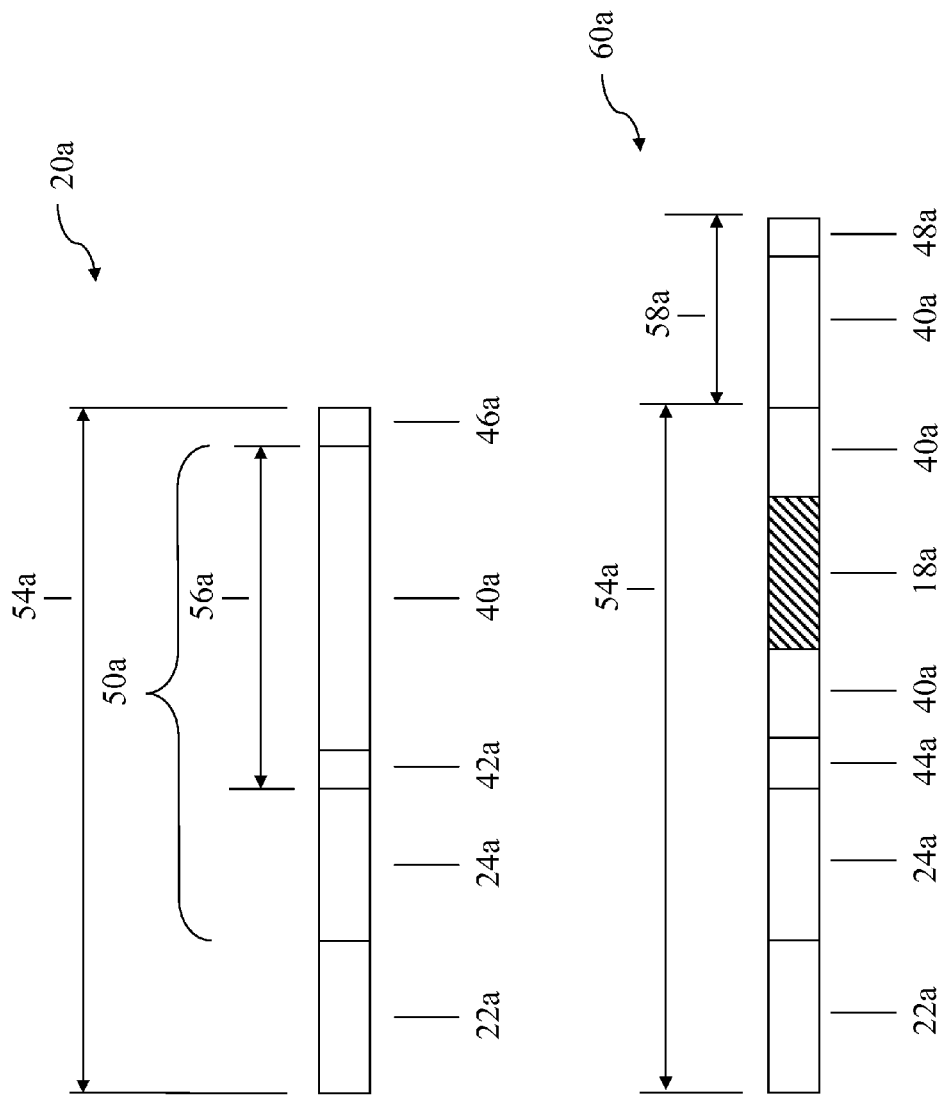
FIG. 4 is a diagram showing an instance of a network layer packet encapsulated within an MAC layer packet, showing the MTU of the packet. In addition, it shows how the insertion of a VCM to create an AP can exceed the MTU.

FIG. 4 illustrates MAC layer packet 20*a* encapsulating network layer packet 50*a*, which encapsulates transport layer header 42*a* and transport payload 40*a*. MAC layer packet 20*a* has a maximum length 54*a* determined by MTU of the system that is established during the path MTU discovery process common to session layer/network layer networks. When VCM message 18*a* is added to MAC layer packet 20*a* to create AP 60*a*, the length of the packet exceeds the maximum length 54*a* by a length of 58*a*. Although AP 60*a* consists of a properly formatted network layer packet encapsulated inside a properly formatted MAC layer packet, it may have problems reaching its destination because it exceeds the MTU 56*a* that is required by hosts and interconnects within the network.

Figure 5:
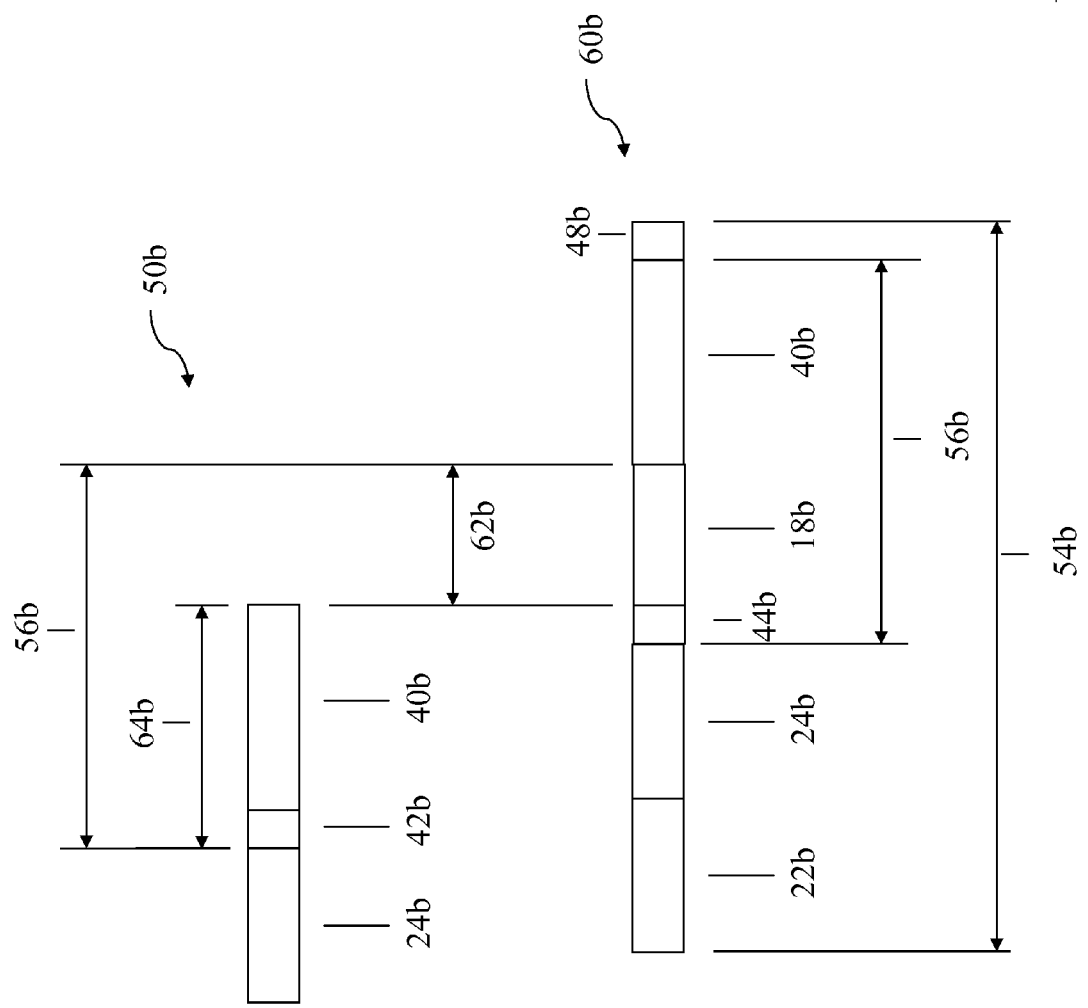
FIG. 5 is a diagram showing an instance of a network layer packet, and how the MTU can be lowered to accommodate the VCM without exceeding the original MTU.

FIG. 5 illustrates the construction of AP 60*b*. A maximum length 62*b* is established for VCM 18*b*. A modified MTU 64*b* is then established by reducing the value of MTU 56*b* by the value of VCM maximum length 62*b*. The network layer of the OSI stack will then generate the network layer packet 50*b* using the modified MTU 64*b*, which will limit the size of the network layer packet 50*b* before the VCM 18*b* is added to it. As a result, VCM 18*b* can be added to network layer packet 50*b* without exceeding MTU 56*b*.

After the VCM 18*b* is added to network layer packet 50*b*, MAC layer header 22*b* and MAC layer CRC 48*b* are added to the packet by the MAC layer data link layer, resulting in AP 60*b*. Since MTU 56*b* is not exceeded, the maximum length 54*b* of AP 60*b* will not be exceeded and packet fragmentation will not occur.

If the total amount of data that needs to be transmitted exceeds the modified MTU 64, then the network layer will split the network layer datagram into two or more fragmented network layer packets. The network layer of the OSI stack will take the remaining data that is to be sent and will form additional network layer packets 50 that will be no larger than the modified MTU 64 until all of the data has been sent. Each fragmented network layer packet 50 will be encapsulated as a standard MAC layer packet 20, with a network layer packet payload 52 consisting of the remaining transport payload 40, as well as a session layer or UDP checksum within transport layer header 42. These remaining fragments will not contain VCM 18, but the data within the fragments will be shifted (encoded) as a result of the VCM.

The MAC layer CRC 48 is appended by a data link layer device after the VCM 18 is added to the packet, and if present during packet receive, the MAC will remove it. After the VCM 18 is inserted, the packet becomes an AP 60. Any checksum or length fields within transport layer header 42 need to be re-calculated to account for the additional data in VCM 18 and re-inserted as modified transport layer header 44. This will allow compatibility with intermediate hardware and software that validates the checksum or length fields.

The maximum segment size (MSS) of the transmitting and receiving hosts is established at the beginning of the TCP session. The normal MSS value is reduced by the maximum size of the VCM 18 to limit or prevent fragmented IP packets.

Figure 6:
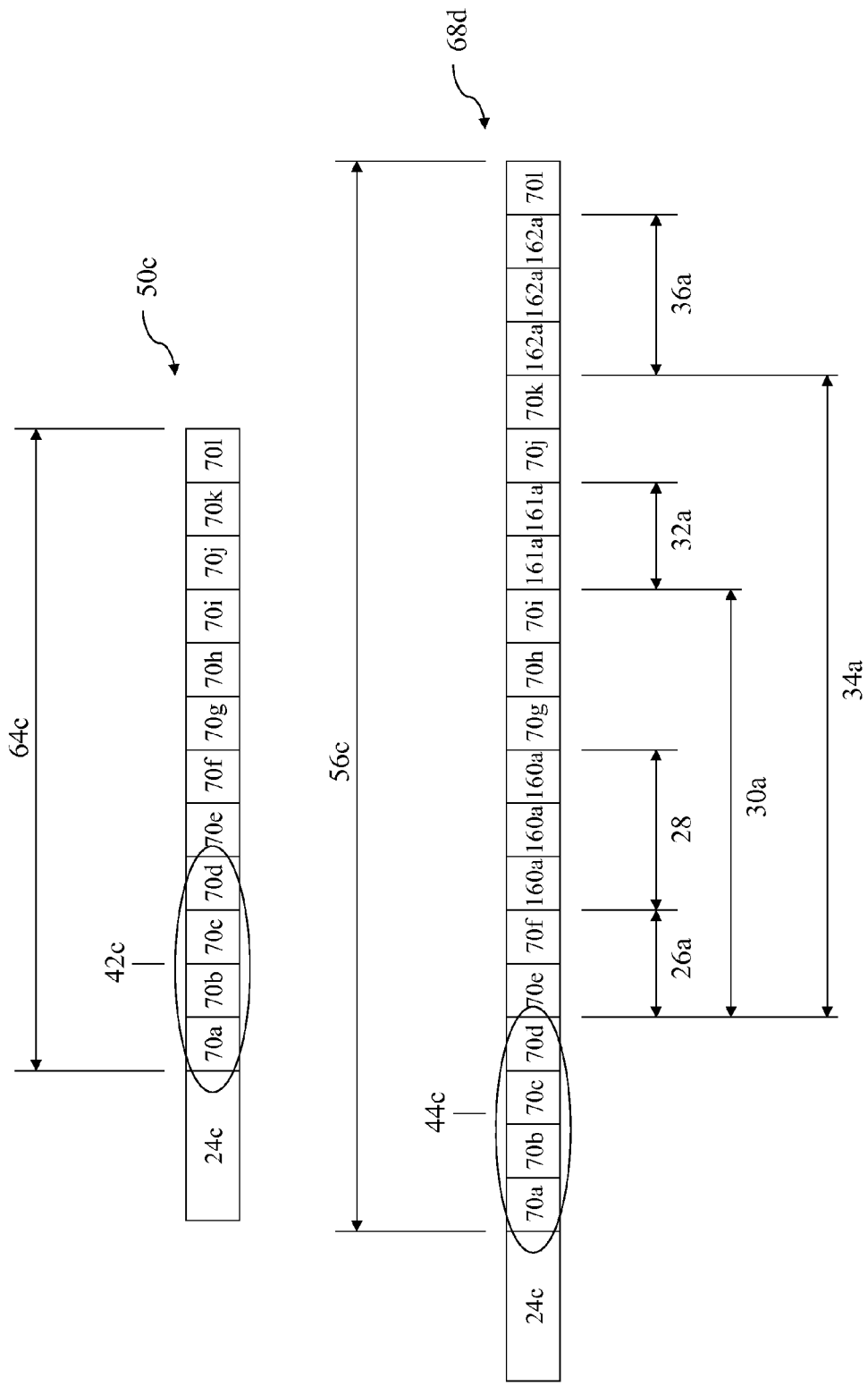
FIG. 6 is a diagram showing how a VCM is broken into three separate chunks and inserted within a network layer packet.

FIG. 6 illustrates network layer packet 50*c* with network layer header 24*c*. The network layer payload of network layer packet 50*c* is shown as individual bytes 70, with byte 70*a* being the first byte to be transferred and byte 70*l* being the last byte to be transferred. The transport layer header 42*c* is illustrated as bytes 70*a* through 70*d*. Transport layer payload is illustrated as bytes 70*e* through 70*l*.

The VCM security function 138 determines that the VCM will be split-up into three separate chunks 160*a*, 161*a*, and 162*a* to be distributed throughout the packet. The VCM security function 138 also determines that chunk 160*a* will have a length 28*a* of three bytes, 161*a* will have a length 32*a* of two bytes, and 162*a* will have a length 36*a* of three bytes. The transport payload 70 will consequently be split-up in three different locations. If the transport payload 70 is encrypted SSL data, the data cannot be decrypted while the VCM chunks are embedded in the packet.

The MTU path discovery method used in session layer/network layer communications establishes MTU 56*c* to be 20 bytes for communications between hosts. The maximum number of bytes that comprise the VCM is established to be eight bytes. Accordingly, the modified MTU 64*c* on each host is set to 12 bytes to accommodate the insertion of the 8-byte VCM 18*c* without exceeding the normal 20-byte MTU 56*c*.

If network layer packet 50*c* is encapsulating another protocol, such as a session layer protocol, then the header of that protocol should be preserved to be compatible with certain interconnects that may use some of the header information for functions such as statistical reporting or error checking. In addition, some protocols may have a data checksum located within their header, which needs to be modified after the VCM 18 is inserted into each packet, so that intermediate interconnects and the receiving host will not reject the packet. For illustration, individual bits 70*a*, 70*b*, 70*c*, and 70*d* comprise header 42*c* for network layer packet 50*c*. The transport layer header 42*c* is modified with a new checksum to become modified transport layer header 44*c* consisting of bits 70*a*, 70*b*, 70*c*, and 70*d* within modified network layer packet 68*d*.

The AP generation function 134 takes the three separate VCM chunks 160*a*, 161*a*, and 162*a* and inserts them between transport payload bytes 70, using offsets 26*a*, 30*a*, and 34*a* from modified transport layer header 44*c*. The resulting network layer packet 68*d* may then be transmitted, or may pass through additional layers of the OSI stack before being transmitted.

Figure 7:
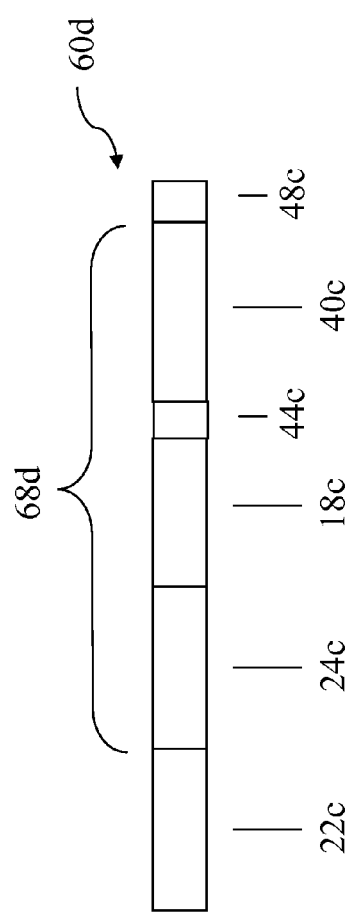
FIG. 7 is a diagram showing how an AP is created from the packet depicted in FIG. 6.

FIG. 7 illustrates the attachment of the MAC layer header 22*c* and MAC Layer CRC 48*c* to modified network layer packet 68*d*, resulting in AP 60*d*. Intermediate devices such as hosts 12 or interconnects 14 that are able to observe the AP 60*d* will process the packet as a normal MAC layer packet encapsulating a normal network layer packet. If the intermediate devices analyze the modified transport layer header 44*c* within AP 60*d*, they will obtain the proper transport layer protocol information and checksum value. This will assure compatibility with interconnects 14 that analyze data in the transport layer protocol headers.

Figure 8:
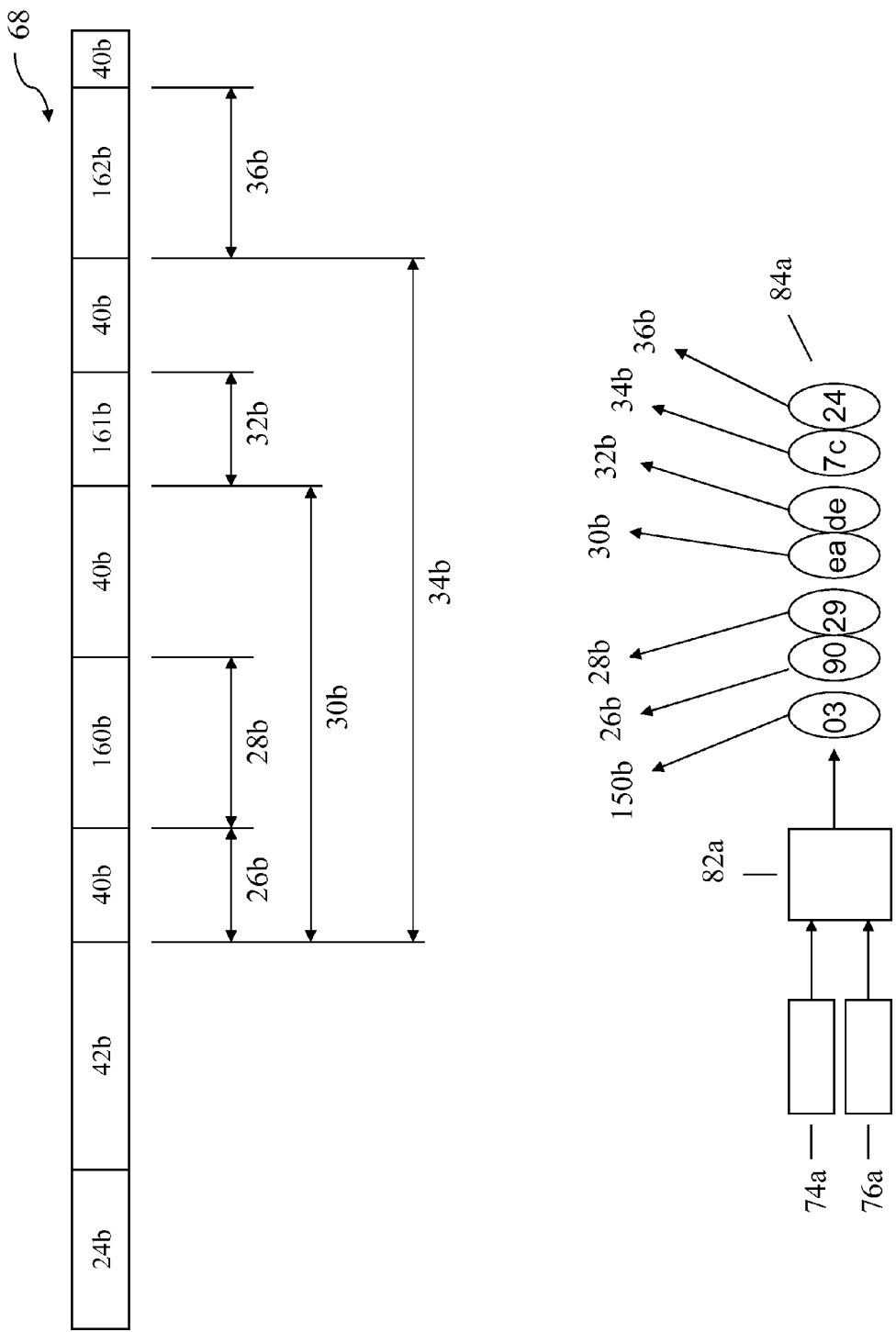
FIG. 8 is a diagram showing how a parameter-based method is utilized to provide the number of VCM chunks, and the starting and ending positions of each chunk to create an encoded VCM.

Turning now to FIG. 8, a parameter-based method is provided for encoding a packet with a VCM 18 to create a modified network layer packet 68. The source MAC address 74a of the sending host 12 is passed along with a base seed 76a to hash generator 82a. The output of hash generator 82a will be a unique parameter-based hash 84a of base seed 76a and source MAC address 74a. The parameter-based hash 84a will be a number that is used to determine the number of VCM chunks 150, as well as the size of each chunk and the offset of each chunk from the transport layer header 42.

In the example shown, the parameter-based hash 84a consists of a 7-byte number in hexadecimal format. Here, the first byte 03 determines that there will be three VCM chunks 150b, referred to as 160b, 161b, and 162b in this example. The second byte 90 determines the byte offset 26b from the end of transport layer header 42b to the first VCM chunk 160b. The third byte 29 determines the length 28b of the first VCM chunk 160b. Similarly, the byte offsets 30b and 34b for VCM chunks 161b and 162b are determined, respectively. The length of VCM chunks 161b and 162b are also determined as 32b and 36b, respectively.

The sending and receiving hosts 12 will each know the base seed 76a, which can be communicated through previous VCM messages during configuration. The source MAC address 74a will be obtained by the receiving host 12 from the MAC Layer header 22 of the received packet. The receiving host 12 will therefore be able to use a local hash generator 82 to recreate the same parameter-based hash 84a that was calculated by the sending host. Once the hash is known, the full VCM 18 can be extracted from the modified network layer packet 68 to obtain both the original network layer packet 50 and the VCM 18.

Figure 9:
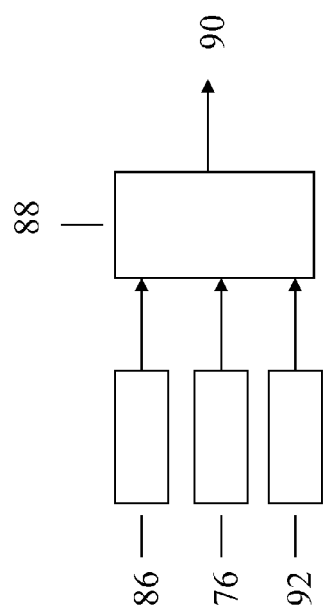
FIG. 9 is a diagram showing how a time-based method is utilized to provide the starting and ending positions of the VCM to create an encoded VCM.

FIG. 9 illustrates a time-based method for encoding a packet with a VCM 18 to create a modified network layer packet 68. Each host 12 that is to communicate with another host will have a local clock 92 that will be synchronized with the other host. This synchronization will happen when a host 12 first attempts to communicate, and periodically as needed to maintain the synchronization of all clocks. The sending host will provide the receiving host with a base seed 76 as well as a time interval 86 at which the host 12 must increment the base seed 76 to generate the next time-based hash 90 from hash generator 88. The time-based hash 90 will be based on the base seed 76 selected during time interval 86. The time-based hash 90 will modify number, length and offset of the VCM chunks in the same manner as the parameter-based hash 84 in the example of FIG. 8.

The receiving host 12 will have a local clock 92 that is synchronized with the transmitting host 12, and will have the same base seed 76. Using the base seed 76 and the time interval 86, the receiving host is able to recreate the time-based hash 90. Once the time-based hash is known, the full VCM 18 can be extracted from the modified network layer packet 68 to obtain both the original network layer packet 50 and the VCM 18. If the VCM 18 is not extracted properly, as indicated by an improperly formatted VCM 18 or incorrect checksum within the VCM 18, the receiving host 12 can attempt to use the previous or next unique hash 90 to extract the VCM 18 from the modified network layer packet 68.

Figure 10:
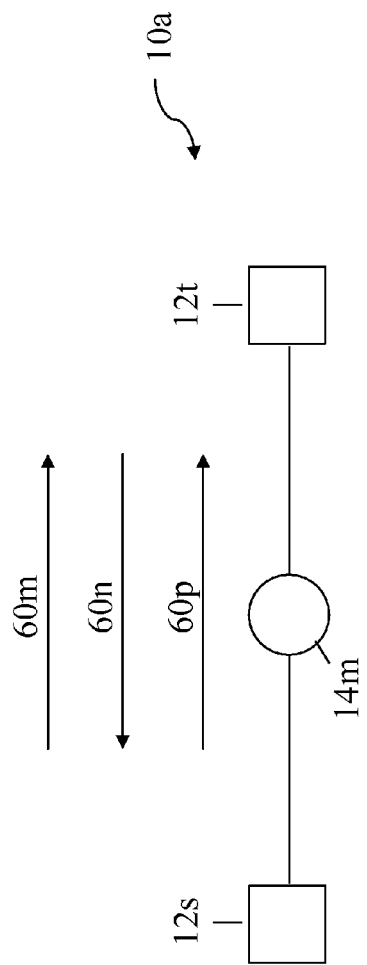
FIG. 10 is a diagram showing two hosts connected to an interconnect, where the two hosts wish to communicate by creating APs that are encoded using a counter-based method.
Figure 11:
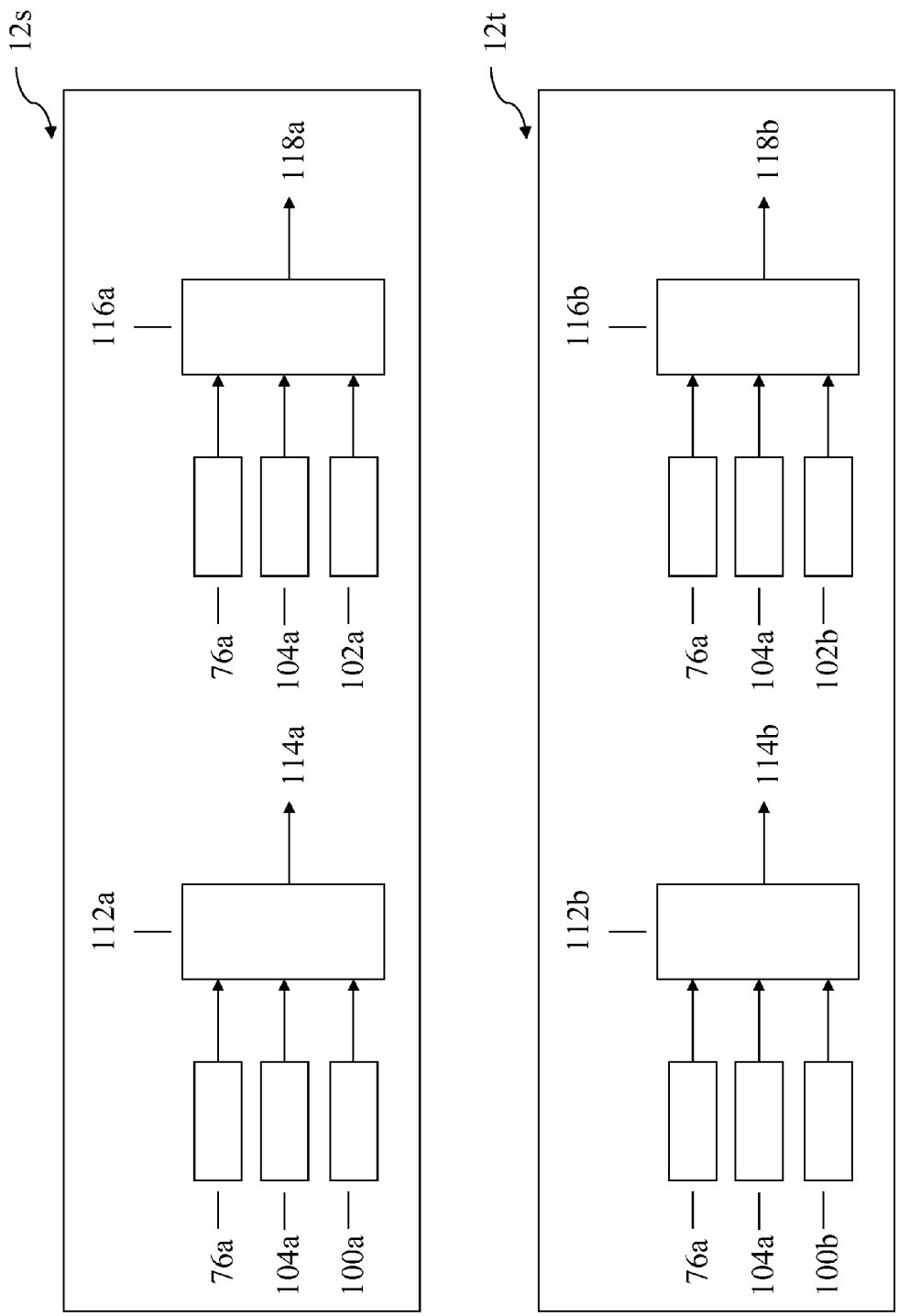
FIG. 11 is a diagram showing how a counter-based method is utilized to provide the number of VCM chunks, and the starting and ending positions of each chunk to create an encoded VCM.

FIGS. 10-11 each illustrate an example of a counter-based method utilized by VCM security function 138 for various purposes, such as determining the location of random data, the number and length of VCM chunks, or the packets that will contain a VCM 18.

Within communications system 10a, host 12s is designated as a server host, while host 12t is designated as the client host connecting to server host 12s. Host 12s first establishes a transmit counter 100a and a receive counter 102a to keep track of, respectively, the number of packets transmitted to, and received from, host 12t. Transmit counter 100a and receive counter 102a are shown within host 12s in FIG. 11.

Host 12s issues a request to target host 12t to initialize a transmit counter 100b and a receive counter 102b to keep track of, respectively, the number of packets transmitted to, and received from, host 12s. This request takes the form of an VCM 18 embedded within an AP 60m, which passes through interconnect 14m to reach host 12t. Transmit counter 100b and receive counter 102b are shown within host 12t in FIG. 11.

Additionally, the VCM 18 within AP 60m provides base seed 76a and counter rollover value 104a to transmit counter-based hash generator 112b and receive counter-based hash generator 116b within host 12t. The VCM 18 within AP 60m also requests host 12t to wait for host 12s to send an AP 60 with instructions to begin counting packets with transmit counter 100b and receive counter 102b. Host 12t will then send an AP 60n to host 12s, acknowledging that it is ready to receive AP's from host 12s.

Host 12s will then begin incrementing the transmit counter 100a and the receive counter 102a, respectively, as packets are transmitted to host 12t and received from host 12t. When the transmit counter 100a reaches counter rollover value 104a, transmit counter 100a resets and the next transmit hash 114a is generated. When the receive counter 102a reaches counter rollover value 104a, receive counter 102a resets, and the next receive hash 118a is generated.

The transmit hash 114 and receive hash 118 both initialize to the value of base seed 76. Each time the counter rollover value 104 is reached, the transmit hash generator 112 or the receive hash generator 116 will change the base seed 76 in such a way that both the transmit hash 114 within the transmitting host and the receive hash 118 within the receiving host will both use the same base seed 76 when transmit counter 100 in the transmitting host and receive counter 102 in the receiving host are equal.

After host 12s receives AP 60n, and establishes transmit counter 100a and receive counter 102a, it sends the first AP 60p to host 12t, incrementing transmit counter 100a and using transmit hash 114a to encode VCM 18 within AP 60p. When host 12t receives AP 60p, receive counter 102b will be equal to transmit counter 100a within host 12s. Base seed 76a and counter reset value 104a will also be the same, and so receive hash generator 116b will generate receive hash 118b that will be equal to transmit hash 114a within host 12s. With the matching hash value, the full VCM 18 can be extracted from the modified network layer packet 68 to obtain both the original network layer packet 50 and the VCM 18.

In a similar manner, packets sent from host 12t to host 12s will have matching transmit hash 114b and receive hash 118a, allowing host 12s to obtain both the original Network Layer packet 50 and the VCM 18.

Figure 12:
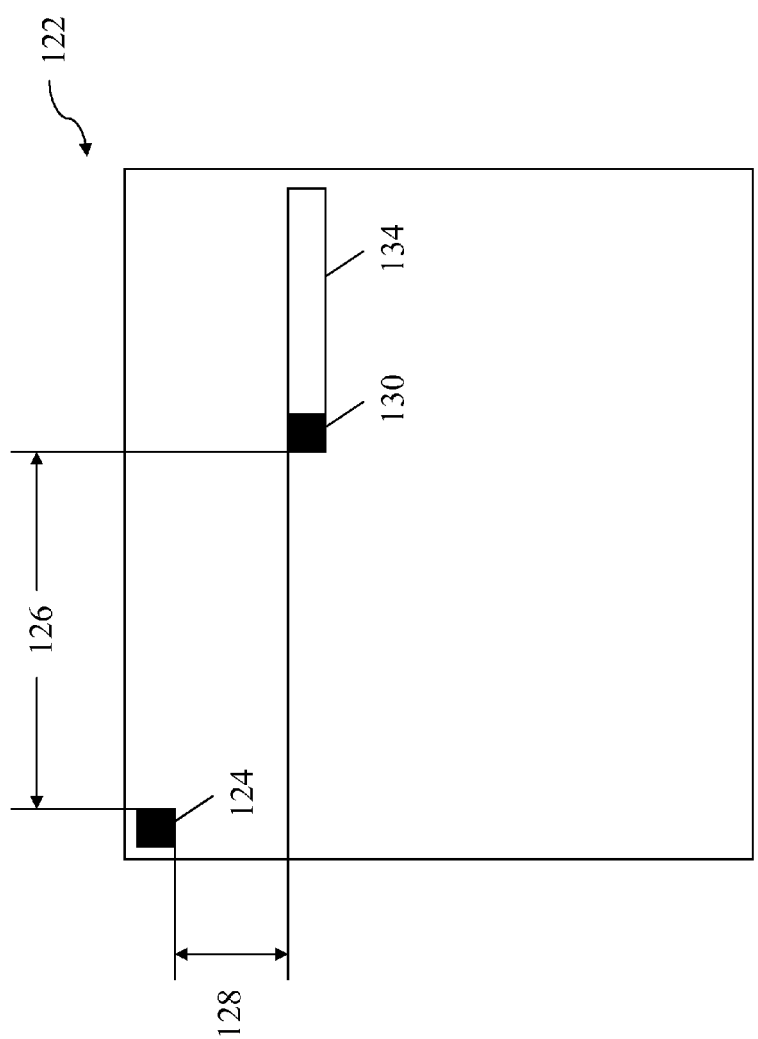
FIG. 12 is a diagram showing a hash-table based method utilized to provide the number of VCM chunks, and the starting and ending positions of each chunk to create an encoded VCM.

Turning now to FIG. 12, a static hash table-based method is utilized by VCM security function 138 for various purposes, such as determining the location of random data, the number and length of VCM chunks, or the packets that will contain a VCM 18.

A hash table 122 will be located within each host 12, such that both hosts 12 that are to communicate have the same hash table 122. In the example shown in FIG. 12, hash table 122 takes the form of a graphical image, with the contents of the hash table being the encoded graphical information that is unique to the graphical image and the image format.

A hash table origin 124 marks the beginning of the graphical information contained in hash table 122. A hash table horizontal offset 126 marks the horizontal distance between the end of the hash table origin 124 and the beginning of the hash table pointer 130. A hash table vertical offset 128 marks the vertical distance between the end of the hash table origin 124 and the beginning of the hash table pointer 130. The hash table horizontal offset 126 and vertical offset 128 can be in units of pixels, characters or binary data. The values of the hash table horizontal offset 126 and vertical offset 128 will be static, and will be provided by the server host to the client host during initialization. The hosts that are to communicate securely will have the same static horizontal offset 126 and vertical offset 128. The hash table pointer 130 is initialized to be located at the hash table origin 124, and is used as the beginning of hash 134 that is utilized by VCM security function 138.

One host designated as the server host may periodically send a message within the control field 136 of a VCM 18 to the client host, requesting the client host to select the next hash table pointer 130 using the hash table horizontal offset 126 and vertical offset 128. This will result in a change of the hash table pointer 130. In the case that the horizontal offset 126 or vertical offset 128 exceed the boundaries of the hash table 122, the offset that exceeded the boundary can wrap around to the other side of the hash table 122. The change in the hash table pointer 130 will result in a new hash 134 utilized by VCM security function 138. Further, the server host may periodically distribute a new hash table horizontal offset 126 or vertical offset 128 to the receiving host 12. This information may be inserted into a VCM 18.

Each host 12 will contain software and/or hardware to provide the ability to send and receive APs 60.

Figure 13:
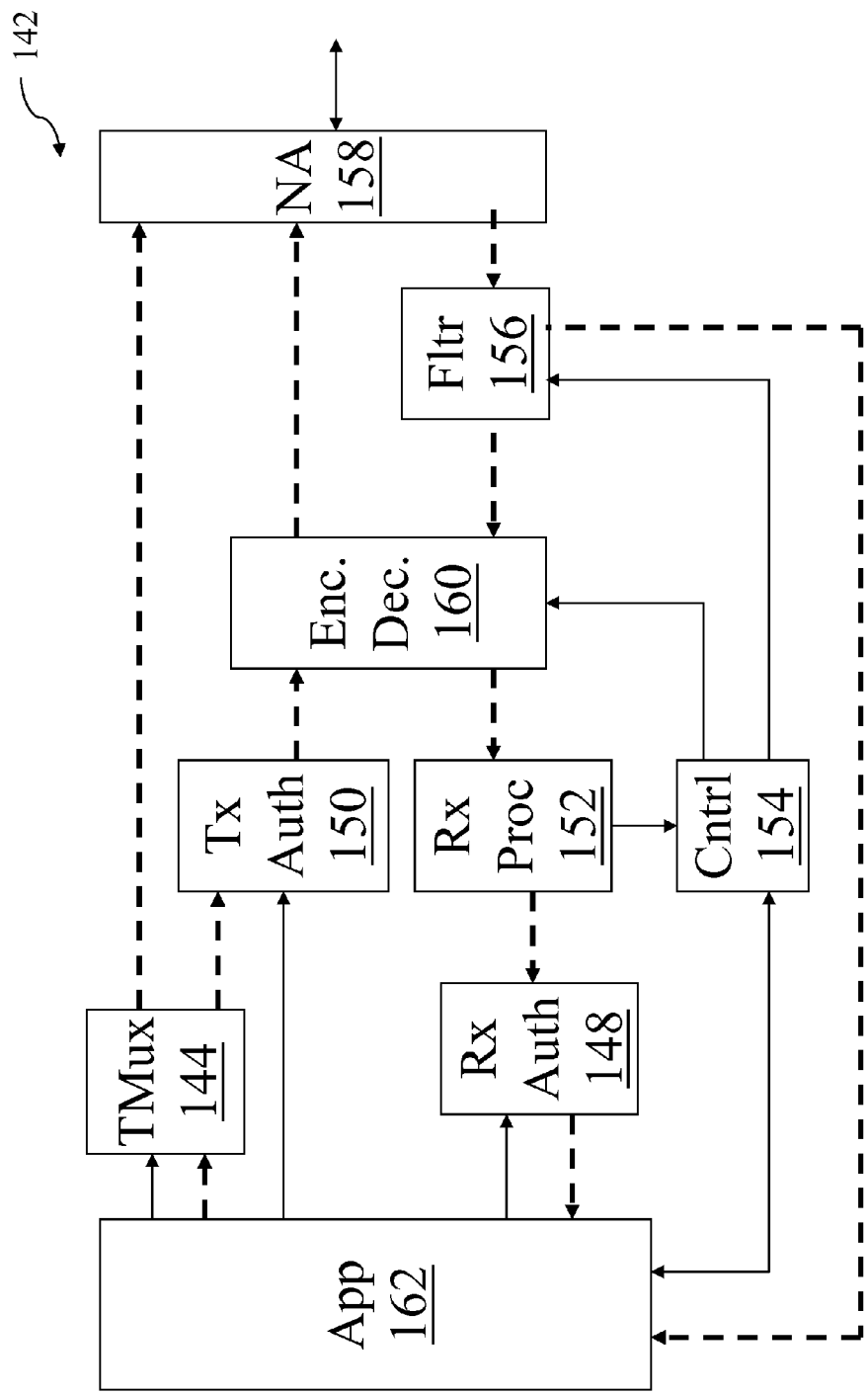
FIG. 13 is a schematic diagram illustrating an embodiment for implementing VCM within a host.

Turning now to FIG. 13, a sample embodiment of implementing VCM within host 12 is shown. In the figure, software and/or hardware scheme to implement this will be referred to as a secure host module (SHM) 142. An application 162, such as an Internet browser, that utilizes a network service connects to a transmission authenticator 146. Application 162 may connect directly to transmission authenticator 146 when all transmission needs to be authenticated or through a multiplexer 144 when some transmission needs to be authenticated. The SHM 142 provides an interface between host applications 162 running on the host 12 and the network adapter 158. Dashed arrows show data paths, while solid arrows show control paths.

The SHM 142 can optionally allow host applications 162 running on the host 12 to communicate with non-hosts using standard MAC layer or session layer/network layer packets. To allow this functionality, SHM control module 154 controls transmit multiplexer 144 to allow the host application 162 to send non-AP packets directly out of network adapter 158, bypassing the encode/decode module 160. This feature allows applications 162 to selective use VCM scheme when needed. For instance, if application 162 is an Internet browser, it could use VCM when needed to secure communication such as financial transactions. For other network accesses such as Internet browsing, it may use non-AP packets.

When AP packets are to be sent from the host application 162, SHM control module 154 uses transmit multiplexer 144 to direct outbound data to the encode/decode module 160, via transmission authenticator 146. Encode/decode module 160 will encode the outbound data into an AP 60 before going to network adapter 158. As previously described, various methods can be used to encode the AP 60. Encode/decode module 160 is controlled by SHM control module 154 to select the encoding and decoding method to be used. The encode/decode module 160 can obtain the source MAC address 74 from network adapter 158 to be used for encoding if necessary.

Packets received by network adapter 158 are first processed by receive filter 156, which determines if incoming packets are AP 60 packets or non-AP packets. Receive filter 156 may use information provided by the encode/decode module 160 and SHM control module 154 to determine the type of packet. Incoming packets that are identified by receive filter 156 to be non-AP packets are sent directly to host application 162 and are unmodified. If the incoming packet is identified as an AP 60, then it is passed on to the encode/decode module 160. The AP 60 is decoded by encode/decode module 160 using the encode/decode method chosen by SHM control module 154. Decoding errors, warnings, messages, and statistics may be passed from encode/decode module 160 to SHM control module 154 as needed.

Once the AP 60 has been decoded by encode/decode module 160, it passes to message extraction module 152, which extracts the VCM 18 from the decoded AP 60 and passes it to SHM control module 154. The VCM 18 contains information to be exchanged between hosts. The message extraction module 152 then removes the VCM 18 from the packet before passing it to the host application 162 as a regular packet such as session layer/network layer.

It should be noted that the FIG. 13 is an embodiment of a possible implementation of secure control and authentication mechanism. In one embodiment, the scheme may be implemented in hardware or software transparent to the user that will automatically control securing communications sessions. In another embodiment, user may be allowed to enable secure communication using this scheme when desired. In yet another embodiment, filtered secure communication may be enabled automatically based on certain filters.

Various modification and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed:

1. A system for authenticating a user on a public data network based on the Internet Protocol ("IP") comprising:
   an originating host connected to said IP network and associated with said user;
   a control information generator coupled to the originating host to insert control information into a plurality of IP data packets emanating from said originating host, wherein the control information includes user verification information inserted into the payload portion of a data packet, and wherein the header of the plurality of IP data packets remains unchanged;
   one or more intermediate devices configured to run standard IP that transmit said plurality of IP data packets based on said unchanged header without the routing being affected by said control information in the payload portion of said IP data packets; and
   a receiving host connected to said IP network for receiving data packets from said originating host, including a function which operates to identify data packets containing said control information in the payload portion, authenticating the user based on said user verification information, and restoring said payload portion of a data packet without said control information.

2. The system of claim 1, wherein the control information generator operates to insert control information into a plurality of data packets in a data stream emanating from the originating host, and the receiving host continuously authenticates the user based on said plurality of data packets having control information.

3. The system of claim 1, wherein the payload portion of each data packet does not contain IP protocol, and each data packet transits at least a portion of the network without reference to the control information.

4. The system of claim 1, wherein said control information includes user verification information and originating host verification information.

5. The system of claim 1, wherein the control information is placed in variable locations within the payload and of variable length, and the payload is encrypted at the originating host.

6. The system of claim 5, wherein the receiving host operates to identify the location and length of the control information, remove the control information, and decrypt the remaining payload.

7. A method of authenticating a host device continuously for a session on a public IP communication network, comprising one or more sending hosts connected across the said public communication network to one or more receiving hosts:
   a. generating data by an application residing on a sending host to be transmitted to a receiving host over said communication system;
   b. requesting a security module on said sending host to transmit said data with authentication information by said application;
   c. generating said authentication information by said security module;
   d. generating a plurality of authenticating packets containing said data and said authentication information in the payload portion of said authenticating packets;
   e. transmitting said authenticating packets over said IP communication network;
   f. delivering said authenticating packets to said receiving host;
   g. extracting said authentication information from said authenticating packets by said receiving host;
   h. restoring the original data by said receiving host by removing authentication information from said payload portion;
   i. authenticating the sending host based on the authentication information by said receiving host; and
   j. delivering the data to an application on the receiving host.

8. The method of claim 7, further ensuring said authenticating packets conform to said IP communication network protocol, wherein the header of said authenticating packets does not change such that the authentication information is transparent to other hosts in the said network.

9. The method of claim 7, wherein said authentication information includes one or more of the following: user name, password, transmitting host, biometrics, CPU identification, hardware configuration, checksum of packet data, packet number, and time.

10. The method of claim 7, wherein said authentication information is encrypted when created.

11. The method of claim 7, wherein authentication information is segmented and each segment is inserted into different locations within the payload portion of said data packets.

12. The method of claim 8, wherein ensuring said authenticating packets conform to said IP communication network includes modifying MTU to accommodate authentication information.

13. A system for authenticating a host device on an IP network comprising:
   a. a sending host connected to said IP network configured to generate a plurality of IP packets;
   b. an authentication information generator coupled to the sending host to insert authentication information into the payload portion of a continuous plurality of said IP packets emanating from said sending host forming a plurality of authenticating packets;
   c. a transmission controller coupled to the sending host to assure IP protocol integrity for said authenticating packets by modifying the MTU value to reflect said authentication information;
   d. one or more intermediate hosts configured to transmit said authenticating packets as standard IP packets; and
   e. a receiving host connected to said IP network for receiving data packets from said sending host, including a function which operates to identify authenticating packets containing said authentication information, authenticating said sending host based on said authentication information, and restoring said IP packets without said authentication information.

14. The system of claim 13, wherein the control information generator operates to insert control information into a continuous plurality of data packets in a data stream emanating from the sending host, and the receiving host continuously authenticates the user based on said continuous plurality of data packets having control information.

15. The system of claim 13, wherein the authentication information is placed in variable locations within the data of the IP packet and of variable length, and the data is encrypted at the sending host.

16. The system of claim 13, wherein the receiving host operates to identify the location and length of the authentication information, remove the control information, and decrypt the remaining data.

* * * * *